L. DAN.
PROTECTIVE CASE FOR PNEUMATIC TIRES.
APPLICATION FILED FEB. 7, 1913.

1,086,653.

Patented Feb. 10, 1914.

WITNESSES:

INVENTOR
Lung Dan

BY
ATTORNEY

UNITED STATES PATENT OFFICE.

LUNG DAN, OF PORTLAND, OREGON.

PROTECTIVE CASE FOR PNEUMATIC TIRES.

1,086,653.  Specification of Letters Patent.  Patented Feb. 10, 1914.

Application filed February 7, 1913. Serial No. 746,872.

*To all whom it may concern:*

Be it known that I, LUNG DAN, a citizen of the Republic of China, and a resident of Portland, Multnomah county, State of Oregon, have invented a new and useful Improvement in Protective Cases for Pneumatic Tires, of which the following is a specification.

This invention relates generally to means for protecting pneumatic tires from the wear and tear due to service. It is a well known fact that the life of the pneumatic tire is comparatively short, and that the cost of tire renewals and repair is a most important item in the ultimate cost of an automobile.

The object of my invention is, therefore, to provide a case to be placed on pneumatic tires, which will sustain the wear and tear that would normally fall upon the tire itself, which will increase the tractive power of the wheel upon which it is used, and which will prevent skidding.

To this end my invention comprises a construction of parts which will provide a flexible protective covering, or case, and means whereby the same may be readily attached to tires of different diameters.

The construction and manner of application of my invention is hereinafter fully set forth.

Figure 1:
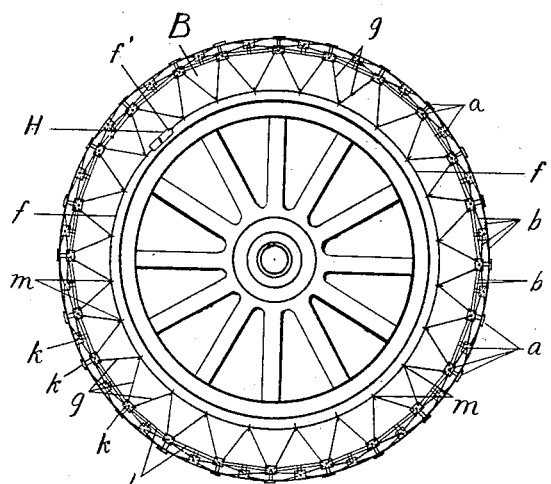
Figure 3:
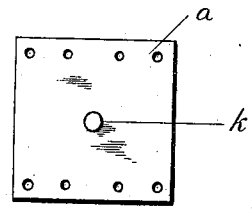
Figure 4:
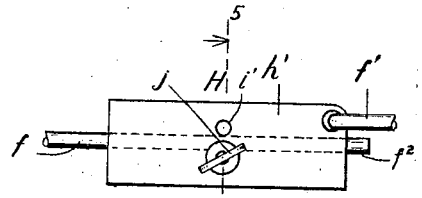
Figure 5:
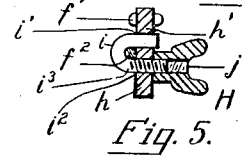
Figure 2:
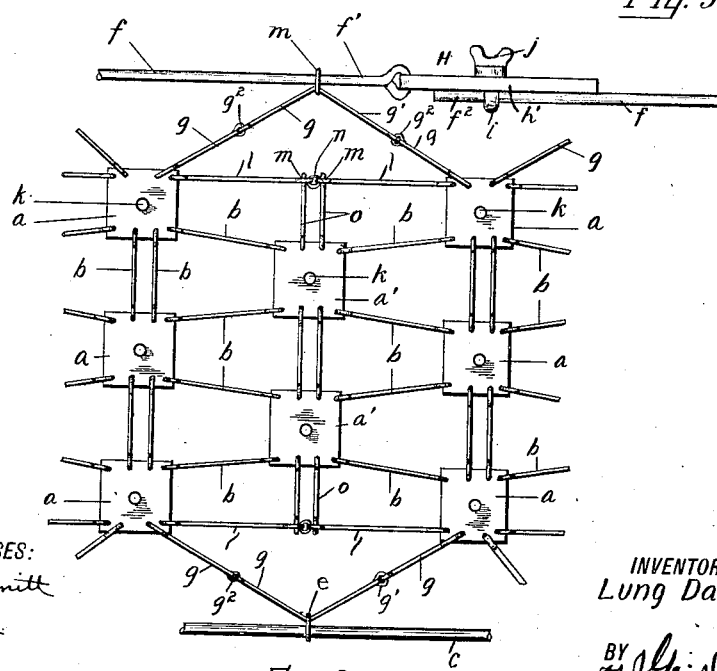

In the accompanying drawings: Figure 1 is a side elevation of an automobile wheel with my invention applied thereto; Fig. 2 is a larger-scale plan or top view of a section of the tire casing, showing the details of construction of the various parts and their flexible connections; Fig. 3 shows on a still larger-scale plan a detail of one of the tread plates; Fig. 4 is a side elevation of the clamping device whereby my tire protector, after being placed on a tire, may be tightened thereon and clamped firmly in place; and Fig. 5 is a vertical section taken approximately on the line 5—5 of Fig. 4.

The body of my protective case consists of a number of flat tread-plates, $a$, arranged in parallel courses, as shown in Fig. 2. The plates of the alternate courses are in transverse alinement with each other, and are staggered from the plates of the adjacent, or other, alternating course, so that the complete tread of the tire will be protected. These tread-plates, $a$, are provided with centrally positioned external rim-spikes $k$, which will give to the tire an efficient grip on the surface of the road-bed, and in so doing the spikes $k$ will also serve to prevent said tire from skidding.

A series of wire links, $b$, flexibly connect the various tread plates, $a$, and maintain the latter in their relative positions with respect to each other. Said series of parallel tread plates are arranged in annular form and they are connected on one side to a cable $c$. On the latter are placed loose rings $e$, and the plates, $a$, adjacent to the cable are flexibly connected to such rings $e$ by links $g$; this arrangement permits the links $g$ to adjust themselves. On the opposite side of my protective case is provided a cable $f$, on which are placed loose rings $m$. The tread plates, $a$, adjacent to the cable $f$ are fastened to said rings, $m$, by links $g$, thus providing a limited movement of the parts so united during the operation of applying my protective case to the tire. The ends of the cable $f$ are adjustably fastened together by means of a special cable clamping device H. Such locking device consists of a clamp-plate $h'$ to which is jointed the end $f'$ of the cable $f$. Two holes are provided in the plate $h'$ at $i'$, $i^2$, for inserting the legs of a U-bolt. The leg $i^3$ of said U-bolt is threaded and a winged nut $j$ is secured thereon; the other or free end $f^2$ of said cable $f$ is passed through the eye formed by the curved portion of the U-bolt. While in the drawing the device H is shown in connection with the cable, $f$, only, it is to be understood that the same means are provided for adjustably fastening together the ends of the cable $c$.

To promote the strength, and at the same time the flexibility, of my protective case, and the convenience with which it may be applied to a tire, the tread plates $a'$ of the alternating courses are tied to longitudinally extending supplemental links, $l$, $l$, as shown in Fig. 2. Said supplemental links, $l$, are fastened to the course of tread plates, $a$. The inner contiguous ends of the supplemental links $l$ are formed with eyes, $m'$, connected by rings $n$. To each of the eyes, $m'$, of the links, $l$, are fastened transverse links $o$, connected at their opposite ends to the contiguous tread plates $a'$.

In applying my invention to a vehicle tire, the body of my protective case is, in the first instance, arranged on the tread of the tire, or in other words, peripherally. The cable, $c$, is then drawn taut, and when so arranged the nut $j$ of its clamping device is screwed up tight, thereby clamping the free end of the cable in place; then the same procedure is followed in adjusting and tightening the other cable. In applying my protective case to the tire, care must of course be taken to so arrange the protective case that the spikes $k$ will project exteriorly. The spikes $k$ not only promote traction contact with the road surface, but also prolong the life of the tread plates, especially of those arranged circumferentially on the crown of the tire, since here is imposed the hardest wear. The application of my protective case to a wheel tire is facilitated and rendered convenient by the fact that the protective casing is flexible and adapted to yield in all directions. To this feature the links connecting the tread plates with each other and to the cables materially contribute.

I claim:

1. A protective casing for pneumatic tires and the like consisting of a body made of a plurality of tread-plates arranged in staggered relation, links connecting the corners of the tread-plates; cables adapted for placing at the sides of the tire; loose rings on such cables; links inserted through said rings; links connecting the extremities of said links with the corners of the adjacent, alternate tread plates; supplemental jointed links arranged longitudinally and parallel to said cables; such supplemental links connecting the corners of the alternate courses of the tread-plates; transversely arranged links tying the lateral members of the other alternate courses of tread plates to said supplemental links; and means for adjustably fastening the cable ends together.

2. A protective casing for pneumatic tires and the like consisting of a body made of a plurality of tread-plates arranged in staggered relation; links connecting the corners of the tread-plates; said tread-plates made with exterior ground spikes; cables adapted for placing at the sides of the tire; loose rings on such cables; links inserted through said rings; links connecting the extremities of said links with the corners of adjacent, alternate tread plates; supplemental links arranged longitudinally and parallel to said cables; such supplemental links connecting the corners of the alternate courses of the tread plates; such supplemental links consisting of two members formed with eyes at their inner or contiguous ends, such eyes located in transverse alinement with alternate courses of tread-plates; rings connecting the eyes of the supplemental links; transversely arranged links tying the lateral members of the other alternate courses of tread plates to said supplemental links; and means for adjustably fastening the cable ends together.

LUNG DAN.

Witnesses:
 WM. C. SCHMITT,
 CECIL LONG.